United States Patent [19]

Taylor

[11] Patent Number: 4,725,124

[45] Date of Patent: Feb. 16, 1988

[54] FIBER OPTIC MICROBEND PHASE SHIFTER AND MODULATOR

[75] Inventor: Henry F. Taylor, Alexandria, Va.

[73] Assignee: The United States of America as represented by the Secretary of the Navy, Washington, D.C.

[21] Appl. No.: 780,495

[22] Filed: Sep. 26, 1985

[51] Int. Cl.[4] ............................................. G02B 6/16
[52] U.S. Cl. ............................................. 350/96.29
[58] Field of Search ............... 350/96.15, 96.16, 96.19, 350/96.29

[56] References Cited

U.S. PATENT DOCUMENTS

| | | | |
|---|---|---|---|
| 4,253,727 | 3/1981 | Jeunhomme et al. | 350/96.29 |
| 4,294,513 | 10/1981 | Nelson et al. | 350/96.29 |
| 4,408,829 | 10/1983 | Fitzgerald, Jr. et al. | 350/96.29 |
| 4,421,979 | 12/1983 | Asawa et al. | 350/96.15 X |
| 4,477,723 | 10/1984 | Carome et al. | 350/96.15 X |

*Primary Examiner*—Eugene R. LaRoche
*Assistant Examiner*—Steven J. Mottola
*Attorney, Agent, or Firm*—John L. Forrest; Murriel E. Crawford

[57] ABSTRACT

A device for shifting the phase of light propagating through an optical fiber, comprising a microbend transducer to bend the optical fiber. The microbend transducer comprises first and second transducer blocks each having a set of teeth positioned so that they face each other with a passageway therebetween through which the optical fiber passes and is bent by them. A device for modulating the intensity of light propagating through an optical fiber which has two tapered ends, comprising first and second mode strippers each operably attached to one of the tapered ends of the optical fiber and a microbend transducer disposed to bend the optical fiber.

4 Claims, 3 Drawing Figures

FIBER OPTIC MICROBEND PHASE SHIFTER AND MODULATOR

BACKGROUND OF THE INVENTION

The present invention relates generally to a fiber optic phase shifter and intensity modulator and more particulary to fiber optic phase shifters and modulators that utilize a microbend transducer.

The ability to shift the phase of light propagating in a single mode fiber is quite useful in fiber optic sensors and may also be used in fiber-optic communications. A conventional way to shift the phase of light propagating in a single mode fiber is by stretching the fiber. This is done by wrapping and gluing the fiber around a cylinder of piezoelectric material. When a voltage is applied to the material, the cylinder expands thereby stretching the fiber. Long lengths on the order of 10 meters of fiber and large voltages are needed to drive the piezoelectric cylinder.

The ability to modulate the intensity of light propagating in a optic fiber is also useful in fiber optic communication and sensing systems. Such modulation can be performed by a device external to the fiber such as an electrooptic modulator formed in a lithium niobate crystal. However, in some uses it is particularly advantageous to perform the modulation on the light as it propagates through the fiber without the use of an external modulating means. This modulation is generally performed by bending the fiber or wrapping it around a small-diameter cylinder. However, these systems have limited communications applications because they require motion of the fiber over large distances and hence are very slow (less than 1 Hz in bandwidth).

Microbend transducers have been used to modulate the intensity of light propagating in highly multimode optical fibers. The periodic perturbation causes the light to couple between adjacent modes in succession until light is finally coupled to radiation modes. However, because this process requires repeated coupling between guided modes prior to coupling to radiation modes it requires a relatively large displacement of the microbend transducer to effect intensity modulation.

OBJECTS OF THE INVENTION

Accordingly, it is an object of the present invention to provide a phase shifter for a single mode fiber.

It is a further object of the present invention to provide a phase shifter for a single mode fiber that utilizes a short length of optical fiber.

It is still a further object of the present invention to provide an intensity modulator of light propagating in an optical fiber.

It is still a further object of the invention to provide an intensity modulator of light propagating in an optical fiber that will operate at frequencies in the audio range and above.

It is still a further object of the invention to provide an intensity modulator of light propagating in an optical fiber that is easily manipulated when operated as a simple attenuator.

Other objects, advantages and novel features of the present invention will become apparent from the detailed description of the invention, which follows the summary.

SUMMARY OF THE INVENTION

Briefly, the above and other objects for the phase shifter are realized by an apparatus to shift the phase of light propagating in a single mode optical fiber comprising first and second transducer blocks positioned along the length of and attached to the optical fiber in a facing and closely spaced relation with each other said first and second transducer blocks having a passage therebetween and means disposed in the passage to bend the optical fiber.

In a preferred embodiment, the bending means comprises first and second sets of transversely extending teeth positioned along the passage in accordance with a fixed common spatial period so that the first set of teeth face and are interposed between the second set of teeth.

The apparatus to modulate light in an optical fiber with tapered ends comprises first and second mode strippers each operably attached to one of the tapered ends of the optical fiber; first and second transducer blocks having a passage therebetween; and means disposed within the passage to bend the optical fiber.

In a preferred embodiment the tapered ends of the optical fiber propogate light in one mode and the untapered portion of the optical fiber propagates light in two modes and the bending means comprises first and second sets of transversely extending teeth positioned along the passage in accordance with a fixed common spatial period so that the first set of teeth face and are interposed between the second set of teeth.

DETAILED DESCRIPTION OF THE PREFERRED EMBODIMENT

The present invention is based on the principle that periodic bending of an optical fiber causes a coupling of light between the various modes of the fiber as the light propagates along the length of the fiber. This coupling can result in a phase shift of the light propagating in the fundamental mode of the fiber and an attenuation of light as well. Which of these two effects is predominant will depend upon the fiber characteristics and upon the spatial period of the periodic bending. In particular, in a single mode fiber for which the spatial period is picked so that synchronous coupling from the fundamental mode to the radiation modes cannot occur, the phase shift is the predominant effect. In a multimode fiber with the spatial period chosen so that synchronous coupling between the fundamental mode and another guided mode can occur, attenuation of the fundamental mode power is the predominant effect.

Figure 1:
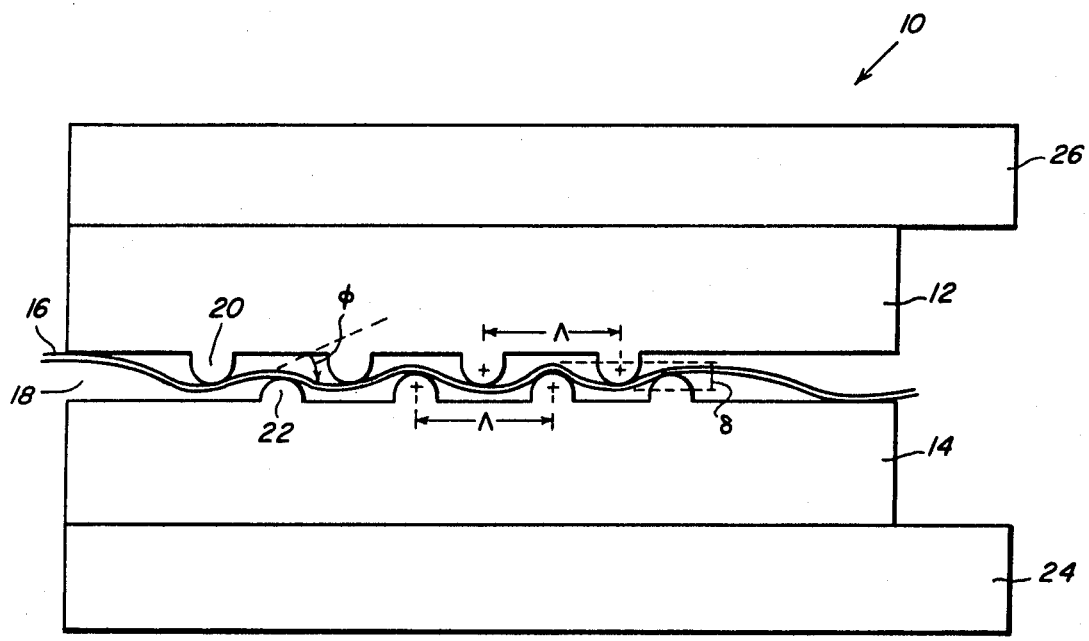
FIG. 1 is a schematic drawing of the side view of the phase shifter according to the present invention.

Referring now to FIG. 1, there is shown the phase shifter 10 according to the present invention. Phase shifter 10 comprises microbend transducer block 12 and microbend transducer block 14 positioned along the length of optical fiber 16 in a facing and closely spaced relation with each other to define therebetween a passage 18. Optical fiber 16 is preferably a single mode optical fiber comprised of any suitable material such as silica.

Transducer block 12 and transducer block 14 bend optical fiber 16 by any mechanical means but in the preferred embodiment shown in FIG. 1 first and second sets of transversely extending teeth 20 and 22 are disposed within passage 18 in accordance with a fixed common spatial period Λ. Teeth 20 are contained in or affixed to transducer block 12, and teeth 22 are contained in or affixed to transducer block 14. The first set of teeth 20 face and are interposed between the second set of teeth 22. Transducer block 12 is mounted to flexible beam 26 and transducer block 14 is mounted to rigid beam 24. Optical fiber 16 is operably attached to transducer block 12 on one end and transducer block 14 on the other end by any suitable means so that optical fiber 16 is under light tension when not bent.

Transducer block 12 and transducer block 14 may be constructed of any suitable material such as metal, glass or plastic. The first and second sets of teeth 20 and 22 can be produced by machining, grinding, casting or any other suitable technique. The spatial period, Λ, should be between approximately 0.2 mm to 2 mm, most preferably 0.4 mm. The amplitude of the fiber bending, δ, may be up to 20 micrometers preferably less than 5 micrometers. The angle that the fiber makes relative to the axis of passage 18, $\phi$, should be less than 2°, preferably less than 0.5°. Optical fiber 16 has a length as small as 1 cm. The depth of the teeth into passage 18 in first and second sets of teeth 20 and 22 is approximately one half the period and should not cause the optical fiber to touch transducer block 12 or transducer block 14 in the area of the teeth.

For optimum operation, the spatial period, Λ, of the transducer blocks 12 and 14 must be fixed so that synchronous coupling between the fundamental mode and the radiation mode is not possible. The spatial period of the first and second sets of teeth 20 and 22 discourages such coupling when the following equation is met:

$$\frac{2\pi}{\lambda}(n_e - n_o) < \frac{2\pi}{\Lambda}$$

where λ is the wavelength of light in free space, $n_e$ is the effective refractive index of the fundamental mode of the fiber and $n_o$ is the refractive index of the cladding of the fiber.

The performance of the phase shifter 10 is affected somewhat by the effects of strain-induced birefringence which causes a slightly different phase shift for one of the polarization states. The placement of two identical phase shifters such as phase shifter 10 in series reduces the effects of strain-induced birefringence. The phase shifters should be oriented at right angles to one another so that one is displaced in the X-direction and the other in the Y-direction so that the second phase shifter can compensate for the change in phase shift for one polarization state caused by the effects of strain induced birefringence.

The spatial period, Λ, might also be adjusted to produce a phase shift for only one polarization state of the optical fiber 16 by cancelling the phase shift for the other polarization state.

In operation, flexible beam 26 is displaced in a direction perpendicular to the axes of optical fiber 16 by any suitable means causing the first set of teeth 20 to move into engagement and bend optical fiber 16.

Figure 2:
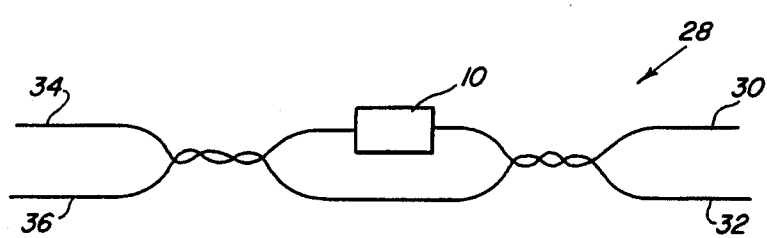
FIG. 2 is a schematic drawing of the side view of the phase shifter in a Mach-Zehnder configuration.

Referring to FIG. 2, the phase shifter 10 is used in a Mach-Zehnder configuration with the phase shifter in one arm of a interferometer 28. The phase shift induced in one arm of the interferometer 28 affects the distribution of power between the interferometer output ports 30 and 32. The interferometer could be used as a four-port switch with 30 and 32 its output ports and 34 and 36 its input ports. For example, if input port 34 alone were used light would merge through output port 30, representing a "straight through" state, or output port 32, representing a "cross over" state, dependent upon the amplitude of the displacement.

Figure 3:
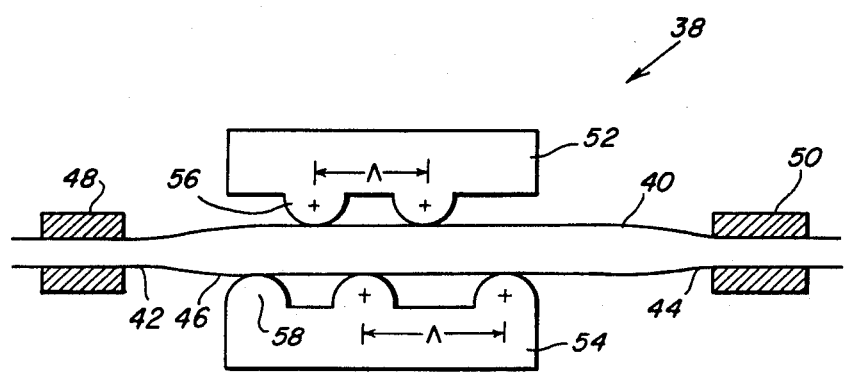
FIG. 3 is a schematic drawing of the side view of the intensity modulator according to the present invention.

Referring to FIG. 3, there is shown an apparatus to modulate light in an optical fiber 38 optical fiber 40 with tapered ends 42 and 44 and an untapered portion 46 there between. A first mode stripper 48 is coupled to tapered end 42 and second mode stripper 50 is coupled to tapered end 44.

The first and second mode strippers 48 and 50 may be any conventional means for absorbing the radiation mode such as covering the optical fiber with black paint or refractive index matching fluid.

Transducer block 52 and transducer block 54 bend optical fiber 40 by any mechanical means, but in the preferred embodiment shown in FIG. 3 first and second sets of transversely extending teeth 56 and 58 are utilized. Teeth 56 are contained in or affixed to transducer block 52 and teeth 58 are contained in or affixed to transducer block 54. The first set of teeth 56 face and are interposed between the second set of teeth 58.

Optical fiber 40 is operably attached to transducer block 52 and transducer block 54 by any suitable means preferably such that the fiber is under light tension when not bent. Optical fiber 40 propagates light in one mode at its tapered ends and propagates light in two modes in the untapered portion. The periodic displacement of optical fiber 40 causes coupling between the two guided modes.

Transducer block 52 and transducer block 54 may be constructed of any suitable material such as metal, glass or plastic. The first and second sets of teeth 20 and 22 can be produced by machining, grinding, casting or any other suitable technique. The spatial period, Λ, should be between approximately 0.2 mm to 2 mm most preferably 0.4 mm. The amplitude of the fiber bending may be up to 20 micrometers preferably less than 5 micrometers. The depth of the teeth in the first and second set of teeth 56 and 58 is approximately one half the spatial period but should not cause optical fiber 16 to touch transducer block 52 or transducer block 54 in the area of the teeth. The angle of the bending should be less than 2° preferrably less than 0.5°.

For optimum operation, the spacial period, Λ, of the teeth in first and second sets of teeth 56 and 58 must be fixed so that it ensures synchronous coupling of power from the fundamental mode to radiation modes.

The apparatus may also be used as a displacement sensor. The transmission loss caused by the periodic displacement of the optical fiber 40 is measured to determine the applied force. The first mode stripper 48 ensures that only guided modes are excited by the light incident on the untapered portion 46 of the optical fiber 40 or mode coupling region. The second mode stripper 50 ensures that only the optical power remaining in the guided mode is detected by removing the light coupled to the cladding modes by the periodic perturbation.

Although any optical fiber may be used greater sensitivity is obtained by utilizing an optical fiber that propagates light in one mode at its tapered ends 42 and 44 and propagates light in two modes at the untapered portion 46. The periodic perturbation in this case induces coupling between two guided modes. The optical fiber 40 is tapered so that only the fundamental mode is excited in the two mode region of the fiber. The high-order guided modes are then coupled to radiation modes at the second tapered end. The second mode stripper 50 removes the energy coupled to radiation modes. For optimum mode coupling the period of the first and second sets of teeth 56 and 58, $\Lambda$, should be in accordance with the following equation:

$$\frac{2\pi}{\lambda}(n_{e1} - n_{e2}) = \frac{2\pi}{\Lambda}$$

where $\lambda$ is the free space wave-length, and $n_{e1}$ and $n_{e2}$ are the effective refractive indices of the two guided modes.

Modulation of the intensity of light passing through a single piece of single mode fiber may also be achieved by choosing a spacial period, $\Lambda$, such that:

$$\frac{2\pi}{\lambda}(n_e - n_o) > \frac{2\pi}{\Lambda}$$

where $\lambda$ is the wavelength of light in free space, $n_e$ is the effective refractive index of the fundamental mode of the fiber and $n_o$ is the refractive index of the cladding of the fiber. When this equation is satisfied, synchronous coupling between the fundamental mode to radiation modes is ensured. Mode strippers 48 and 50 on either side of the two mode region will ensure that only the fundamental mode of the optical fiber 40 is excited and that radiation mode power is removed downstream from the microbend region.

There is therefore been described a phase shifter and an intensity modulator that comprises two transducer blocks which create a spatial periodic bending in an optical fiber that induces mode coupling. The phase shifter is operable with short lengths of fiber and the intensity modulator operates at frequencies in or even above the audio range and is easily controllable when operated as an attenuator.

Obviously many modifications and variations of the present invention are possible in light of the above teachings. It is therefore to be understood that within the scope of the appended claims, the invention may be practiced otherwise than as specifically described.

What is claimed and desired to be secured by letters patent of the United States is:

1. An apparatus to shift the phase of light propagating in an optical fiber comprising:
    a first and second transducer block defining a passageway therebetween;
    a first single mode optical fiber disposed within said passageway;
    means disposed in said passageway for bending said optical fiber, said bending means including first and second sets of transversely extending teeth affixed to first and second transducer blocks respectively and positioned along said passageway in accordance with a fixed common spatial period $\Lambda$ defined by the following equation $$\frac{2}{\lambda}(n_e - n_o) < \frac{2}{\Lambda}$$

where $\lambda$ is the wavelength of fill space, $n_e$ is the effective refractive index of the fundamental mode of said optical fiber, and $n_o$ is the refractive index of the cladding of the optical fiber and wherein said spatial period is within the range of 0.2 mm to 2 mm, said first set of teeth being interposed between said second set of teeth; and
    a second single mode optical fiber coupled to said first single mode optical fiber at two points, with an uncoupled area therebetween.

2. An apparatus to modulate light in an optical fiber comprising:
    an optical fiber having a first an a second tapered end, and an untapered portion positioned between said first and second tapered ends, wherein said first and second tapered ends propagate light in one node and said untapered portion propagates light in at least two modes;
    a first and a second mode stripper each operably attached to one of said tapered ends of said optical fiber;
    a first and a second transducer block defining a passageway therebetween;
    said untapered portion of said optical fiber being disposed within said passageway; and
    means disposed within said pasasgeway and affixed to said first and second transducer blocks to bend said optical fiber, said bending means including a first and a second set of transversely extending teeth affixed to said first and second transducer blocks respectively and positioned along said passageway in accordance with a fixed common spatial period.

3. An apparatus as in claim 2 wherein said spatial period $\Lambda$, is defined by the following equation $$\frac{2\pi}{\lambda}(n_{e1} - n_{e2}) = \frac{2\pi}{\Lambda}$$

where $\lambda$ is the free space wavelength, and $n_{e1}$ and $n_{e2}$ are the effective refractive indices of two guided modes.

4. An apparatus as in claim 2 wherein said optical fiber includes a cladding on its periphery, and wherein said spatial period $\Lambda$, is defined by the following equation $$\frac{2\pi}{\lambda}(n_e - n_o) > \frac{2\pi}{\Lambda}$$

where $\lambda$ is the wavelength of light in free space, $n_e$ is the effective refractive index of the fundamental mode of said optical fiber and $n_o$ is the refractive index of the cladding of said optical fiber.

* * * * *